(12) United States Patent
Kolda et al.

(10) Patent No.: US 8,505,950 B2
(45) Date of Patent: Aug. 13, 2013

(54) TRACTOR AND TRAILER COMBINATION

(75) Inventors: Michal Kolda, Prague (CZ); Petr Prochazka, Prague (CZ); Antonin Ryska, Prague (CZ); Marketa Kopecka, Vsetin (CZ); Arnost Hurych, Prague (CZ); Michal Hegar, Prague (CZ); Vaclav Rajtmajer, Beroun (CZ); Jakub Pardubicky, Prague (CZ); Vladimir Kmoch, Prague (CZ)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 13/163,868

(22) Filed: Jun. 20, 2011

(65) Prior Publication Data

US 2012/0319379 A1    Dec. 20, 2012

(51) Int. Cl.
  *B60D 1/62* (2006.01)
(52) U.S. Cl.
  USPC .......................... 280/420; 280/421; 280/422
(58) Field of Classification Search
  USPC ......................................... 280/420, 421, 422
  See application file for complete search history.

(56) References Cited

U.S. PATENT DOCUMENTS

| | | | |
|---|---|---|---|
| 1,973,610 A | 9/1934 | Connors | |
| 2,730,183 A | 1/1956 | Svoboda | |
| 2,859,980 A | 11/1958 | Holland | |
| 2,996,315 A | 8/1961 | Roth et al. | |
| 3,391,950 A | 7/1968 | Carter et al. | |
| 3,628,811 A * | 12/1971 | Rivers | 280/421 |
| 3,888,513 A | 6/1975 | Pilz et al. | |
| 4,072,381 A | 2/1978 | Burkhart et al. | |
| 4,076,272 A * | 2/1978 | Penton | 280/421 |
| 4,183,599 A | 1/1980 | Wetzig | |
| 5,060,964 A | 10/1991 | Vick | |
| 5,143,392 A | 9/1992 | Collins | |
| 5,156,349 A | 10/1992 | Wilson et al. | |
| 5,293,108 A | 3/1994 | Spudich | |

(Continued)

FOREIGN PATENT DOCUMENTS

| | | |
|---|---|---|
| DE | 20320832 U1 | 3/2005 |
| EP | 1465299 A1 | 10/2004 |

(Continued)

OTHER PUBLICATIONS

International Search Report and Written Opinion for Application No. PCT/US2012/041818 dated Feb. 25, 2013 (10 pages).

*Primary Examiner* — Tashiana Adams
*Assistant Examiner* — Marlon Arce
(74) *Attorney, Agent, or Firm* — Michael Best & Friedrich LLP

(57) ABSTRACT

A tractor and trailer combination including a tractor having a tractor frame, a supply unit, a trailer coupling, a skid plate, and a first connector coupled to the tractor frame and coupled to the supply unit to receive at least one of high voltage electrical power and coolant from the supply unit. The combination also includes a trailer having a trailer frame, a tractor coupling rotatably connecting the trailer to the tractor, and a second connector coupled to the trailer and configured to provide the at least one of high voltage electrical power and coolant to the trailer. The combination further includes a conduit having a first end coupled to the first connector, a second end coupled to the second connector. The conduit flexes and is supported between the first and second ends by the skid plate throughout rotation of the trailer relative to the tractor.

19 Claims, 8 Drawing Sheets

(56) References Cited

U.S. PATENT DOCUMENTS

| | | |
|---|---|---|
| 5,516,136 A | 5/1996 | Matthews et al. |
| 5,739,592 A * | 4/1998 | Rigsby et al. ............... 307/9.1 |
| 6,179,319 B1 | 1/2001 | Malisch et al. |
| 6,182,995 B1 * | 2/2001 | Wall .............................. 280/420 |
| 6,709,001 B1 | 3/2004 | Morgan et al. |
| 7,057,376 B2 * | 6/2006 | Cook et al. ................... 323/207 |
| 7,575,450 B2 | 8/2009 | Williams et al. |
| 7,712,760 B2 * | 5/2010 | Ohtomo ........................ 280/422 |
| 7,731,215 B2 * | 6/2010 | Alguera ........................ 280/420 |
| 7,793,966 B2 | 9/2010 | Richter et al. |
| 7,802,652 B2 | 9/2010 | Bennett et al. |
| 8,262,119 B2 * | 9/2012 | Glazner ........................ 280/422 |
| 2002/0050698 A1 | 5/2002 | Dippenaar |
| 2005/0115749 A1 | 6/2005 | Morita et al. |
| 2008/0129010 A1 | 6/2008 | Alguera |

FOREIGN PATENT DOCUMENTS

| | | |
|---|---|---|
| GB | 2204844 A | 11/1988 |
| GB | 2209507 A | 5/1989 |
| JP | 11105519 A | 4/1999 |
| WO | 2010118420 A2 | 10/2010 |

* cited by examiner

TRACTOR AND TRAILER COMBINATION

BACKGROUND OF THE INVENTION

The present invention generally relates to a tractor and a trailer combination, and more particularly to a tractor and trailer combination involving an electric trailer refrigeration unit that enables a functional trailer rotating angle with respect to the tractor during a tractor turning operation.

In a typical situation, a common trailer refrigeration unit is installed on the trailer together with a diesel engine and its own diesel tank for the unit power supply. Therefore, the refrigeration unit operation is independent from the tractor with no requirements on connection between the tractor and the unit. The connection between a tractor and a trailer is provided by coiled and stretchable hoses and cables. The tractor has a pneumatic power braking system connected to a braking system of the trailer. This pneumatic system has one or more air pressure outlets connected with hoses. These hoses transmit the effects of the air pressure of the braking system from the tractor to the braking system of the trailer. Air hoses used for the described purposes are usually lightweight and they float between the tractor and the trailer. Power for the board DC voltage on the trailer is also provided by an electric cable from the tractor. These electrical cables transfer only low voltage (12 or 24 V DC) and they also do not have any special demands on the connection between the tractor and the trailer. Furthermore, these hoses and cables are coiled (i.e., spiral shaped) and stretchable in order to accommodate the demanded trailer rotating angle during turning operations. For example, the common uncoiled length of these cables and hoses is 6 meters to ensure this requirement. The coiled and stretchable cables and hoses retract to a length substantially shorter than the 6 meters such that when the tractor and trailer are aligned, the cables and hoses are shortened such that they float and do not drop in a slack condition and interfere with the coupling between the tractor and the trailer.

SUMMARY OF THE INVENTION

In contrast with a common refrigeration unit with an internal diesel engine, the present invention relates to the use of an electric trailer refrigeration unit, which utilizes energy from the tractor engine or electric power from tractor propulsion system, and therefore requires a special connection between a tractor and an electric unit installed on a trailer. For example, in case of an alternator concept, an additional alternator (high voltage alternator for power supply of electric refrigeration unit), which converts a mechanical energy from the tractor engine to AC electrical energy, is installed as a part of the tractor. This alternator requires a high voltage connection with a static converter (a power electric drive capable to convert electric input power from the alternator into a controlled output power suitable to drive the electric refrigeration unit), which belongs to the refrigeration unit installed on the trailer. The high voltage connection needs to be provided by a multi-core shielded high voltage cable, which is not available as a coiled and stretchable cable due to the required large cross section and shielding. The static converter and the high voltage alternator can be water cooled, where the water cooling system operates as an internal part of the electric refrigeration unit, and thus there is another requirement for heavy coolant hoses connections between the unit and the tractor.

The purpose of the present invention is to provide a method for the connection and support of massive high voltage electric cables and heavy fluid hoses between a tractor and an electric refrigeration unit mounted on the trailer in order to accommodate required trailer rotating angles seen during turning.

In one embodiment, the invention provides a tractor and trailer combination including a tractor having a tractor frame, a supply unit coupled to the frame, and a trailer coupling coupled to the tractor frame. A skid plate is coupled to the tractor frame adjacent the trailer coupling. A first connector is coupled to the tractor frame and coupled to a supply unit to receive at least one of high voltage electrical power and coolant from the supply unit. The combination also includes a trailer having a trailer frame and a tractor coupling connected to the trailer frame and removably coupled to the trailer coupling to rotatably connect the trailer to the tractor. A second connector is coupled to the trailer and configured to provide the at least one of high voltage electrical power and coolant to the trailer. The combination further includes a conduit having a first end coupled to the first connector and a second end coupled to the second connector. The conduit is configured to deliver the at least one of high voltage electrical power and coolant from the first connector to the second connector. The conduit flexes and is supported between the first and second ends by the skid plate throughout rotation of the trailer relative to the tractor.

In another embodiment the invention provides a tractor and trailer combination that includes a tractor having a tractor frame, a supply unit coupled to the frame, and a trailer coupling coupled to the tractor frame. A first connector is coupled to the tractor frame and coupled to a supply unit to receive a supply from the supply unit. The combination also includes a trailer having a trailer frame and a tractor coupling connected to the trailer frame and removably coupled to the trailer coupling to rotatably connect the trailer to the tractor. A second connector is coupled to the trailer and configured to provide the supply to the trailer. The combination further includes a conduit having a first end coupled to the first connector and a second end coupled to the second connector. The conduit is configured to deliver the supply from the first connector to the second connector. The combination also includes an energy chain surrounding the conduit. The energy chain protects and guides the conduit between the first and second ends as the conduit flexes throughout rotation of the trailer relative to the tractor.

In yet another embodiment the invention provides a tractor and trailer combination including a tractor having a tractor frame, a high voltage alternator coupled to the frame, and a trailer coupling coupled to the tractor frame. A first connector is coupled to the tractor frame and coupled to the high voltage alternator to receive high voltage electrical power from the high voltage alternator. The combination also includes a trailer having a trailer frame, an electric trailer refrigeration unit coupled to the trailer frame, and a tractor coupling connected to the trailer frame and removably coupled to the trailer coupling to rotatably connect the trailer to the tractor. A second connector is coupled to the trailer and configured to provide the high voltage electrical power to the electric trailer refrigeration unit. The combination further includes a conduit having a first end coupled to the first connector and a second end coupled to the second connector. The conduit is configured to deliver the high voltage electrical power from the first connector to the second connector. The conduit flexes throughout rotation of the trailer relative to the tractor.

Other features and aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
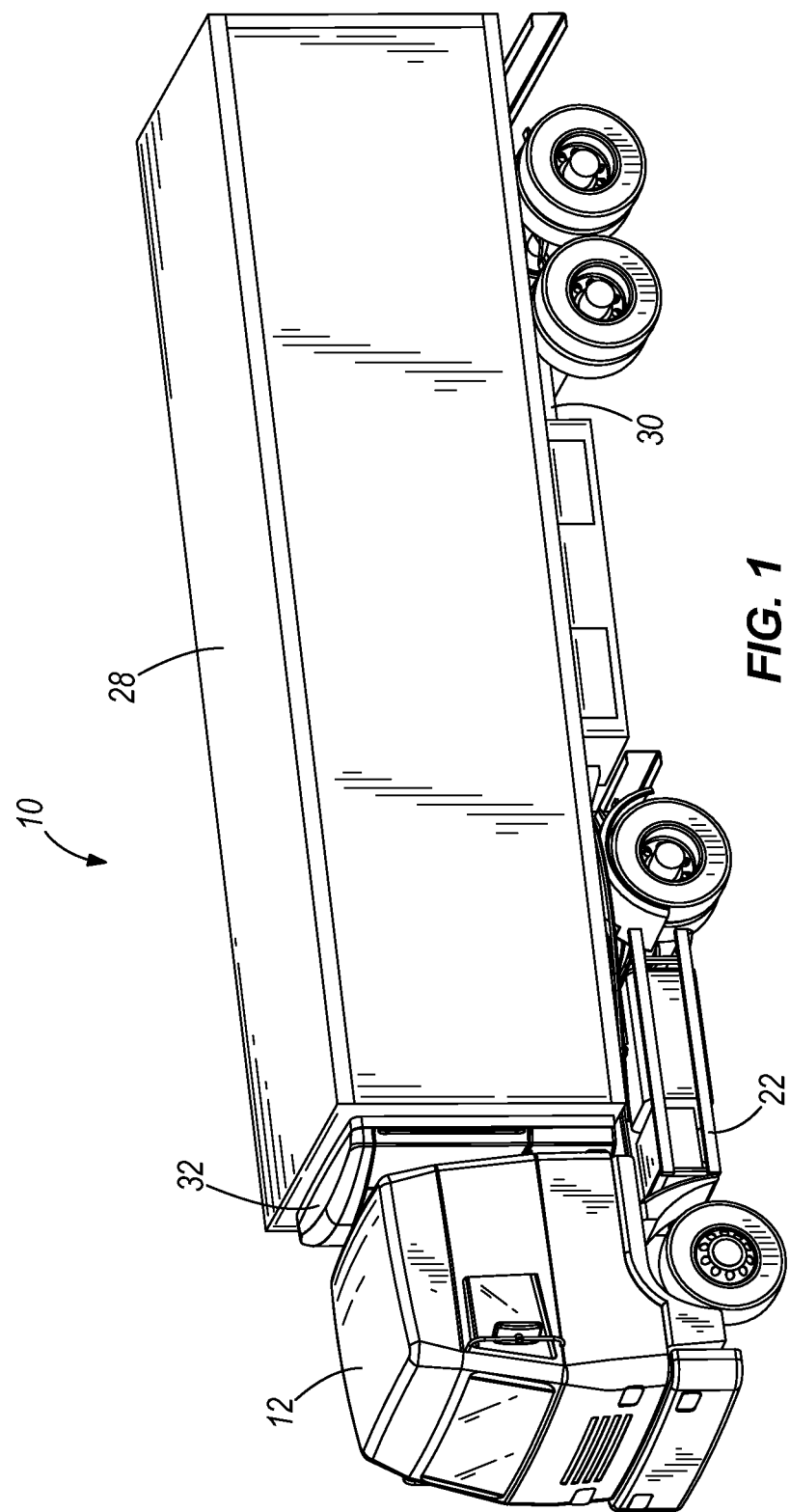
FIG. 1 is a perspective view of a tractor and trailer combination.
Figure 2:
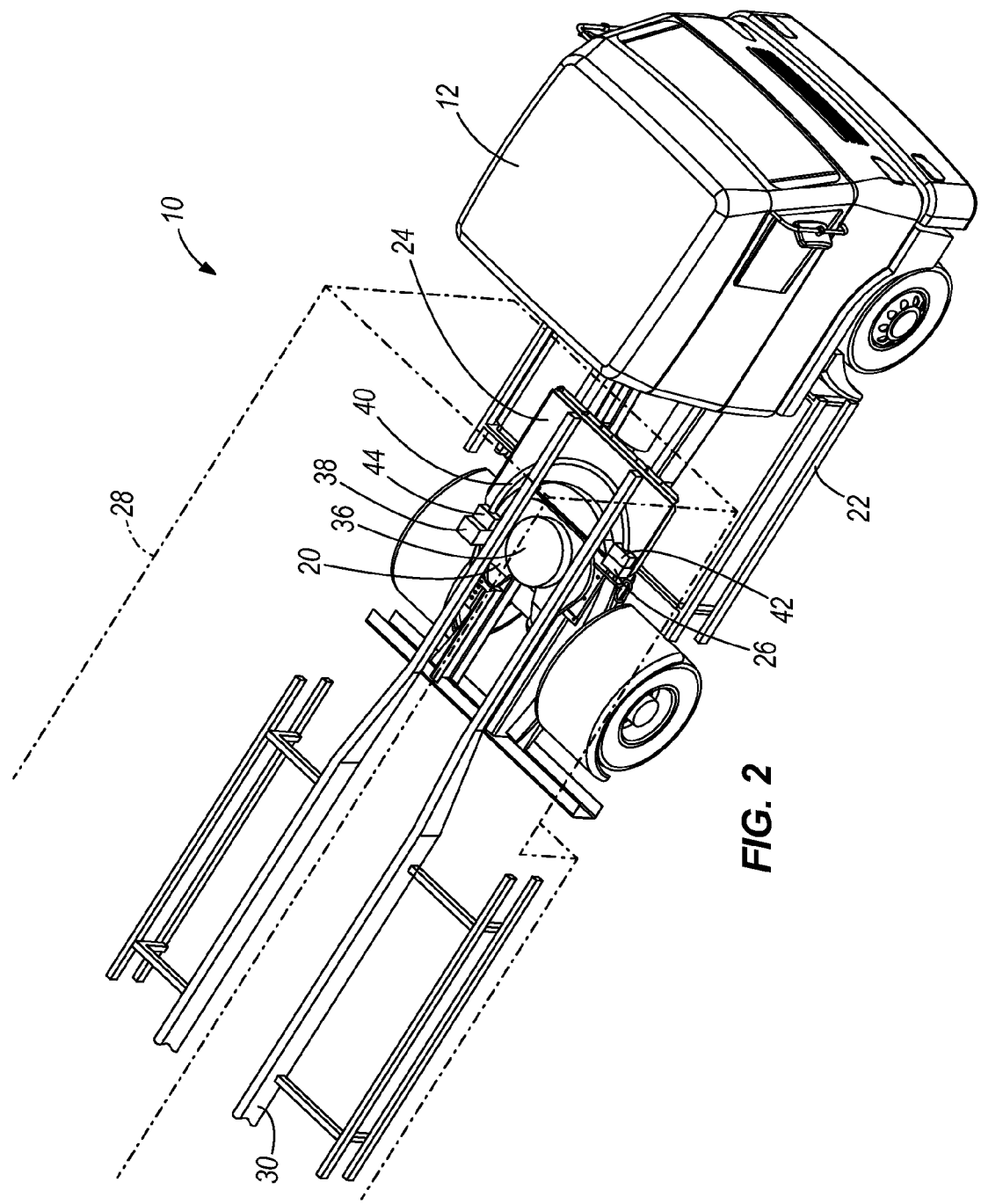
FIG. 2 is an assembled view of a tractor and trailer combination according to one embodiment of the invention.
Figure 3:
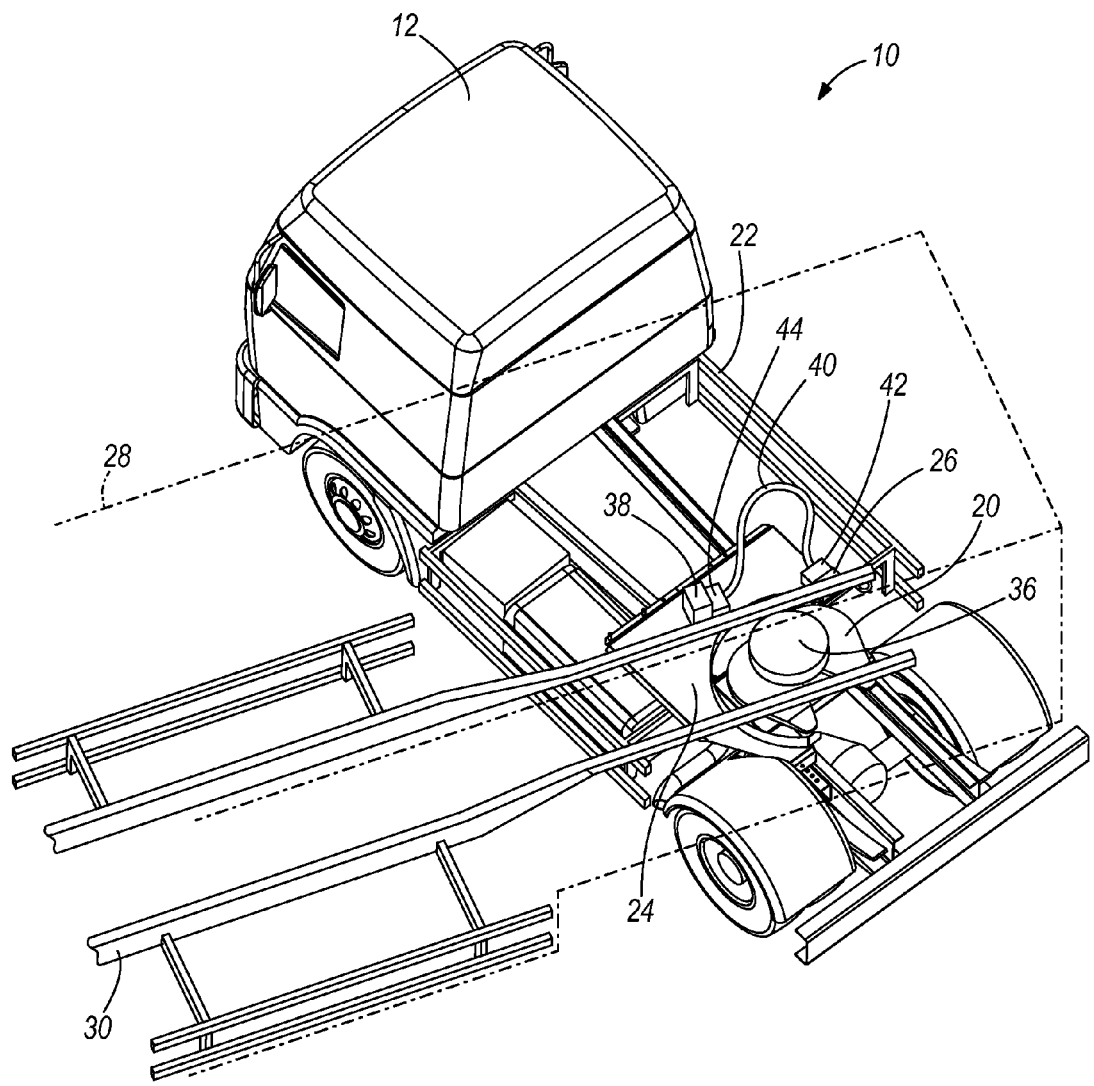
FIG. 3 is an assembled view of the tractor and trailer combination shown in FIG. 2.
Figure 4:
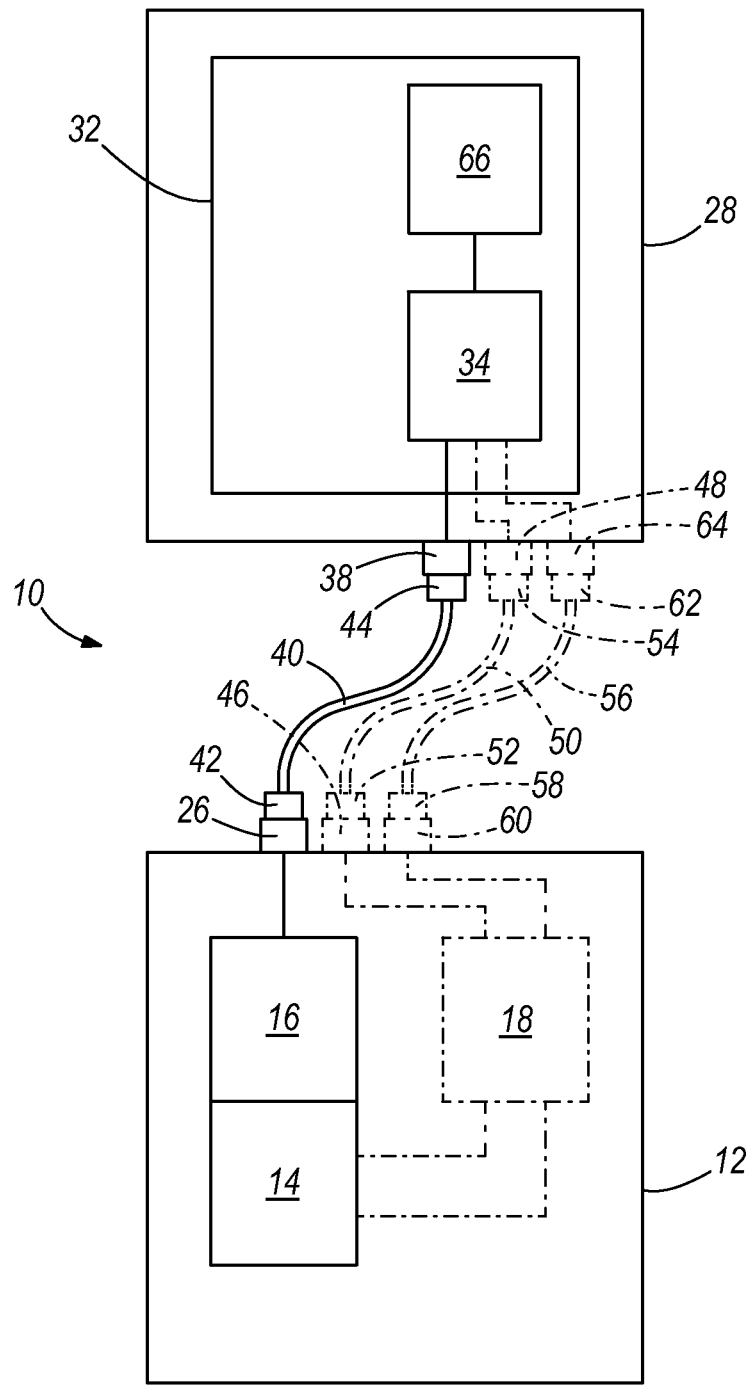
FIG. 4 is a schematic view of the tractor and trailer combination shown in FIG. 2.

FIGS. 1-4 illustrate a tractor and a trailer combination 10 according to one embodiment of the invention. With reference to FIG. 4, the illustrated tractor and trailer combination 10 includes a tractor 12 having a main drive engine 14, a first supply unit or high voltage alternator 16 coupled to the engine 14 for supplying high voltage electrical power (e.g., greater than 24 Volts) when driven by the engine 14, and a second supply unit or cooling system 18 for supplying coolant (e.g., ethylene glycol, diethylene glycol, propylene glycol, etc.) to cool, among other things, the engine 14. A trailer coupling 20 is also coupled to the tractor frame 22.

A skid plate 24 is coupled to the tractor frame 22 adjacent the trailer coupling 20. Referring to FIGS. 2 and 3, the skid plate 24 is coupled to the tractor frame 22 forward of the trailer coupling 20. Alternatively, the skid plate 24 may be coupled to the tractor frame 22 rearward of the trailer coupling 20.

A first connector 26 is coupled to the tractor frame (either directly or indirectly through the skid plate 24). The first connector 26 is also coupled to the high voltage alternator 16 to receive high voltage electrical power.

The illustrated tractor and trailer combination 10 also includes a trailer 28 having a trailer frame 30, and an electric refrigeration unit 32 with a static converter 34 (FIG. 4) coupled to the trailer frame 30. Referring back to FIG. 2, a tractor coupling 36 is connected to the trailer frame 30 and removably coupled to the trailer coupling 20 to rotatably connect the trailer 28 to the tractor 12. A second connector 38 is coupled to the trailer 28. The second connector 38 is configured to provide the high voltage electrical power to the static converter 34.

The illustrated tractor and trailer combination 10 further includes a conduit 40 having a first end 42 coupled to the first connector 26 and a second end 44 coupled to the second connector 38. The conduit 40 has a fixed length (i.e., it is not coiled or stretchable) and is a multi-core shielded high voltage cable. The conduit 40 is configured to deliver the high voltage electrical power from the first connector 26 to the second connector 38.

In other embodiments, such as the one illustrated in FIG. 4, a third connector 46 is coupled to the tractor frame 22 and to the cooling system 18 to receive coolant from the cooling system. A fourth connector 48 is coupled to the trailer frame 30 and configured to provide coolant to the static converter 34 to cool the static converter 34. A second conduit 50 including a first end 52 coupled to the third connector 46 and a second end 54 coupled to the fourth connector 48 is configured to deliver coolant from the third connector 46 to the fourth connector 48. The second conduit 50 is a supply hose. In a similar arrangement, a third conduit 56, or a return hose, is connected at a first end 58 to a fifth connector 60 coupled to the tractor frame 22 and the cooling system 18 and at the second end 62 to a sixth connector 64 coupled to the trailer frame 30 and the static converter 34 to return the coolant back to the cooling system 18 from the static converter 34. In embodiments in which first, second, and third conduits 40, 50, 56 are used, the first, second, and third conduits 40, 50, 56 can be bundled or tied together to follow the same travel path as the first conduit 40, which is described in greater detail below.

In operation, the trailer coupling 20 of the tractor 12 is removably coupled to the tractor coupling 36 of the trailer 28 to rotatably connect the tractor 12 to the trailer 28. The tractor and trailer combination 10 enables a substantially maximum trailer rotating angle of 110 degrees with respect to the tractor 12 during a tractor turning operation in each direction from the centered or aligned relative positions (shown in FIGS. 1 and 2). As shown in FIGS. 2 and 3, after coupling of the tractor 12 and the trailer 28, the conduit 40 is connected between the first and second connectors 26, 38 such that the conduit 40 is supported at least partially by the skid plate 24 as the conduit 40 flexes throughout rotation of the trailer 28 relative to the tractor 12. In this manner, the movement of the conduit 40 is controlled such that it does not interfere or become pinched by the trailer and tractor couplings 20, 36.

Figure 5:
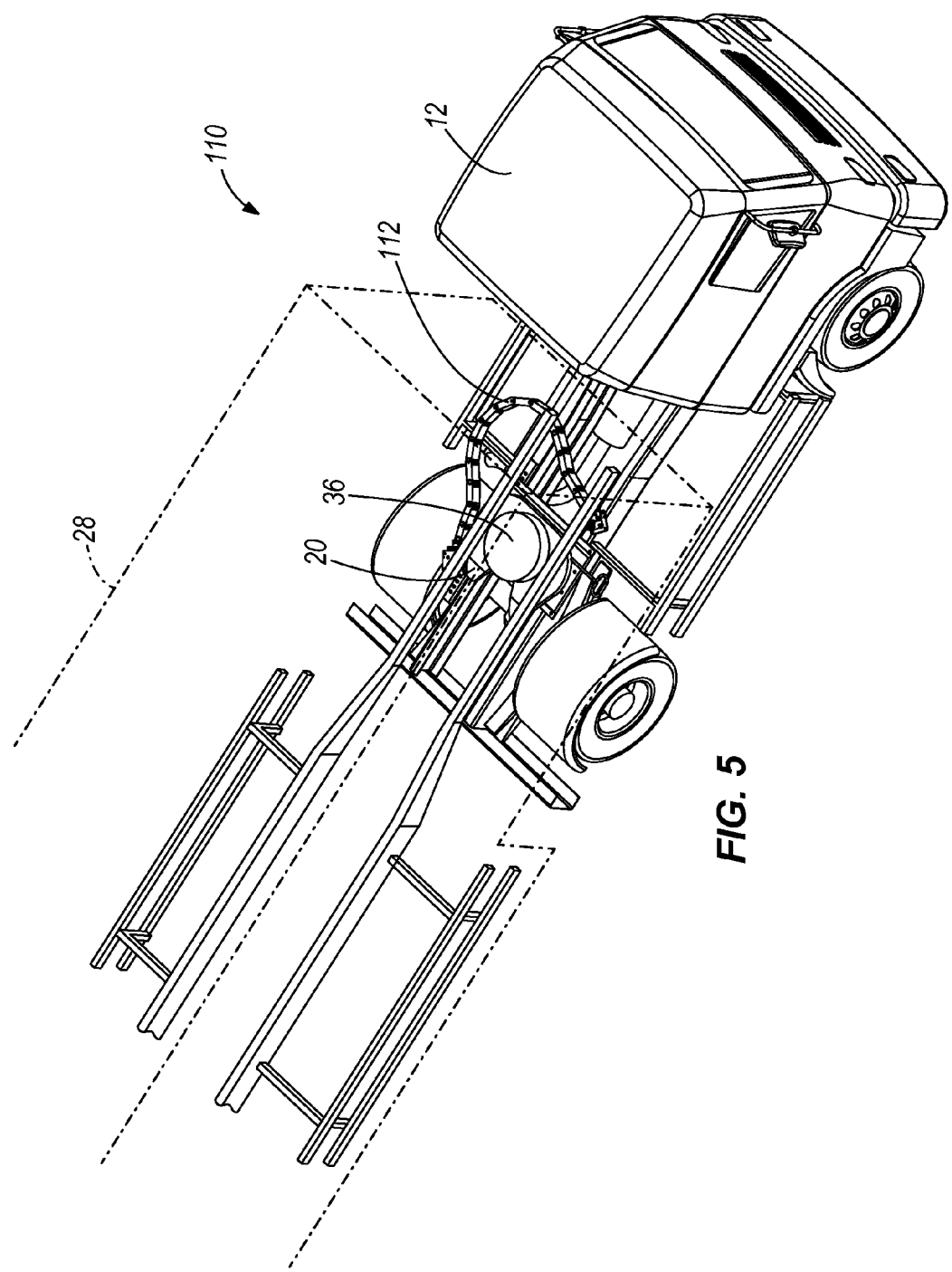
FIG. 5 is an assembled view of a tractor and trailer combination according to another embodiment of the invention.
Figure 6:
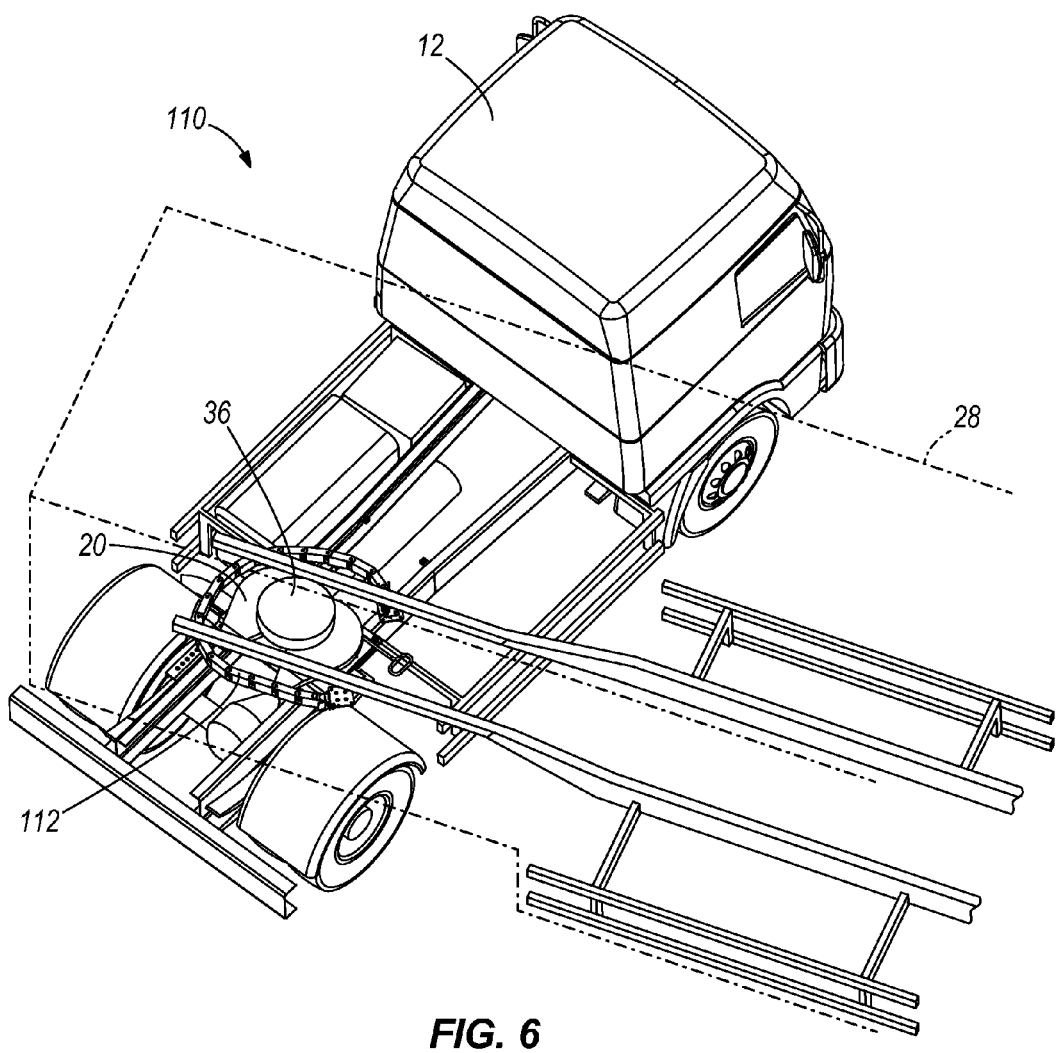
FIG. 6 is an assembled view of the tractor and trailer combination shown in FIG. 4.

FIGS. 5 and 6 illustrate a tractor and a trailer combination 110 according to another embodiment. The tractor and trailer combination 110 includes features similar to the tractor and trailer combination 10 of FIGS. 1-4, and therefore, only the differences between the tractor and trailer combinations 10 and 110 will be discussed below.

The illustrated tractor and trailer combination 110 includes an energy chain 112 and not a skid plate. The energy chain 112 surrounds the conduit 40. Energy chains, such as those sold by IGUS® GmbH, are developed to guide and protect moving cables and hoses. They are made from a number of links that each serve as an accessible compartment to receive and maintain a cable or hose and that collectively limit the motion of the cable or hose along a controlled path. For example, as shown in FIGS. 5 and 6, the energy chain may limit the movement of the chain within a single horizontal plane such that the conduit 40 is supported by the energy chain as it flexes throughout rotation of the trailer 28 relative to the tractor 12. In this manner, the movement of the conduit 40 is controlled such that it does not interfere or become pinched by the trailer and tractor couplings 20, 36. The links of the chain can be made from metals or polymers.

Figure 7:
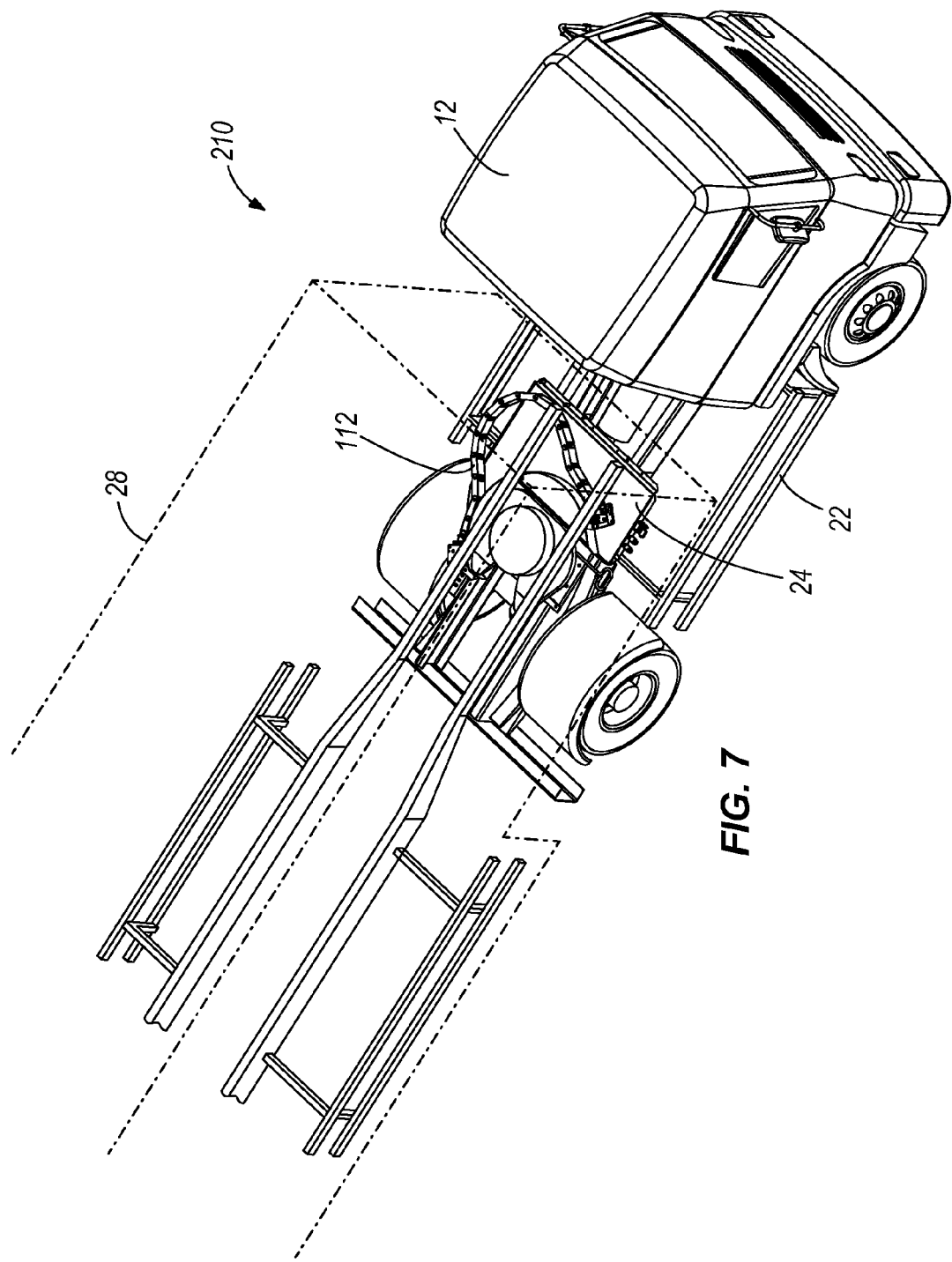
FIG. 7 is an assembled view of a tractor and trailer combination according to yet another embodiment of the invention.
Figure 8:
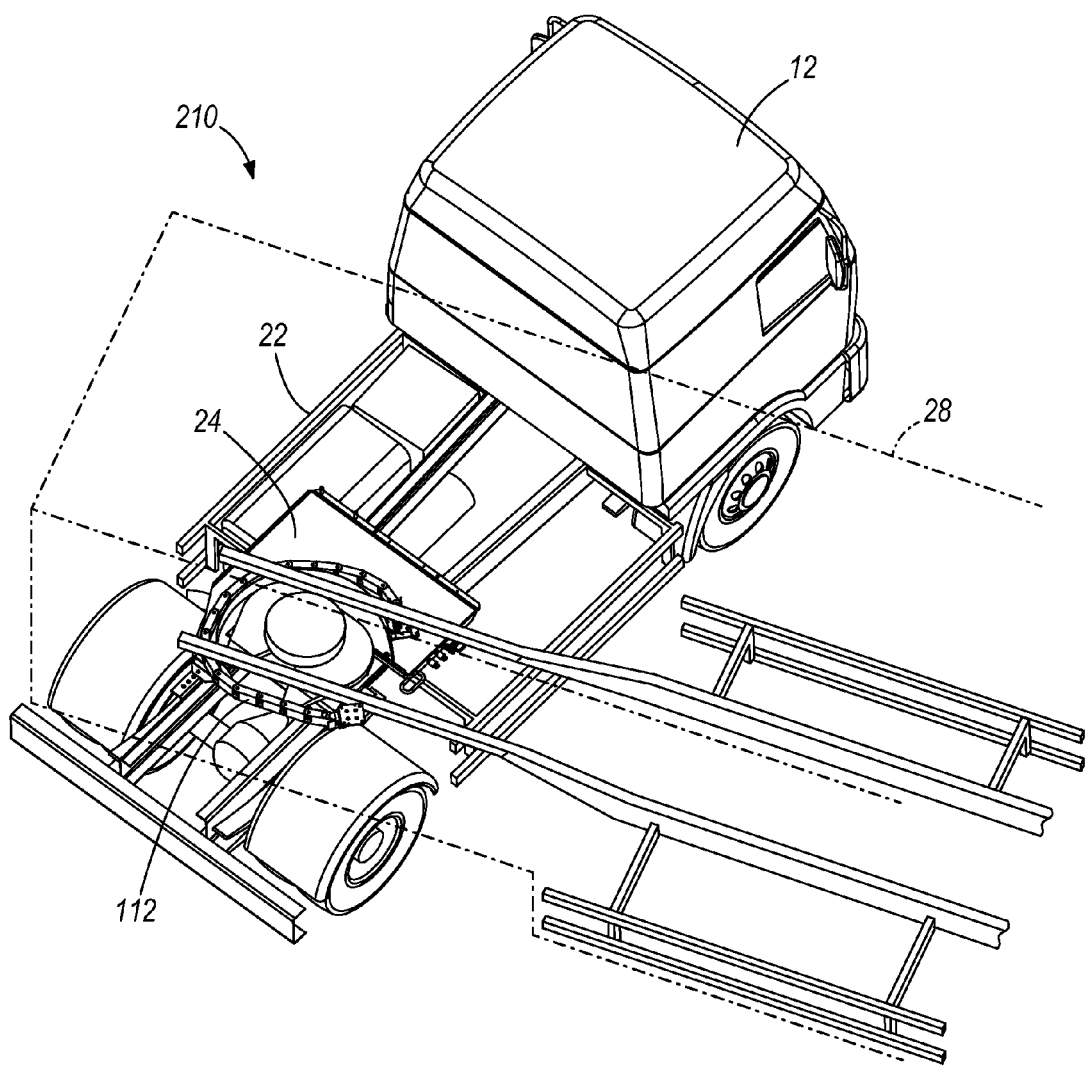
FIG. 8 is an assembled view of the tractor and trailer combination shown in FIG. 6

FIGS. 7 and 8 illustrate a tractor and a trailer combination 210 according to yet another embodiment. The tractor and trailer combination 210 includes features similar to the tractor and trailer combinations 10, 110 of FIGS. 1-4 and FIGS. 5 and 6, and therefore, only the differences between these tractor and trailer combinations 10, 110 and the one illustrated in FIGS. 7 and 8 will be discussed below.

The illustrated tractor and trailer combination 210 includes a skid plate 24 coupled to the tractor frame 22 and an energy chain 112 supported by the skid plate 24. The energy chain 112 surrounds the conduit 40.

The conduit 40 is surrounded by the energy chain 112 that protects and guides the conduit 40 between the first end 42 and the second end 44 as the conduit 40 flexes throughout rotation of the trailer 28 relative to the tractor 12. The energy chain 112 also protects the conduit 40 from abrasion. The skid plate 24 supports the conduit 40 and the energy chain 112 between the first and second ends 42, 44 throughout rotation of the trailer 28 relative to the tractor 12. In this manner, the movement of the conduit 40 is controlled such that it does not interfere or become pinched by the trailer and tractor couplings 20, 36.

The static converter 34 of the electric refrigeration unit 32 is a power electric drive that converts high voltage electrical power from the alternator 16 into a controlled output power suitable to drive a refrigeration system 66 (e.g., a compressor, condenser fans, evaporator fans, and a refrigeration system controller) of the electric refrigeration unit 50. As described above, the static converter 34 is cooled by coolant from the cooling system 18 of the tractor 12.

Various features and advantages of the invention are set forth in the following claims.

What is claimed is:

1. A tractor and a trailer combination comprising:
    a tractor including
        a tractor frame,
        a supply unit coupled to the tractor frame,
        a trailer coupling coupled to the tractor frame,
        a skid plate coupled to the tractor frame rearward of the trailer coupling, and
        a first connector coupled to the tractor frame, the first connector coupled to the supply unit to receive at least one of high voltage electrical power and coolant from the supply unit;
    a trailer including
        a trailer frame,
        a tractor coupling connected to the trailer frame and removably coupled to the trailer coupling to rotatably connect the trailer to the tractor, and
        a second connector coupled to the trailer, the second connector configured to provide the at least one of high voltage electrical power and coolant to the trailer; and
    a conduit including a first end coupled to the first connector and a second end coupled to the second connector, the conduit configured to deliver the at least one of high voltage electrical power and coolant from the first connector to the second connector,
    wherein the conduit flexes and is supported between the first and second ends by the skid plate throughout rotation of the trailer relative to the tractor.

2. The tractor and the trailer combination of claim 1, further comprising an energy chain surrounding the conduit, the energy chain protecting and guiding the conduit between the first and second ends as the conduit flexes throughout rotation of the trailer relative to the tractor, wherein the energy chain is supported by the skid plate.

3. A tractor and a trailer combination comprising:
    a tractor including
        a tractor frame,
        a supply unit coupled to the tractor frame,
        a trailer coupling coupled to the tractor frame,
        a skid plate coupled to the tractor frame adjacent the trailer coupling, and
        a first connector coupled to the tractor frame, the first connector coupled to the supply unit to receive at least one of high voltage electrical power and coolant from the supply unit;
    a trailer including
        a trailer frame,
        a tractor coupling connected to the trailer frame and removably coupled to the trailer coupling to rotatably connect the trailer to the tractor, and
        a second connector coupled to the trailer, the second connector configured to provide the at least one of high voltage electrical power and coolant to the trailer;
    a conduit including a first end coupled to the first connector and a second end coupled to the second connector, the conduit configured to deliver the at least one of high voltage electrical power and coolant from the first connector to the second connector, wherein the conduit flexes and is supported between the first and second ends by the skid plate throughout rotation of the trailer relative to the tractor; and
    a low voltage electrical cable connected between the tractor and the trailer for supplying low voltage electricity to lights on the trailer, and further comprising air hoses connected between the tractor and the trailer for supplying pressurized air for brakes on the trailer.

4. The tractor and the trailer combination of claim 3, wherein the skid plate is attached to the tractor forward of the trailer coupling.

5. The tractor and the trailer combination of claim 1, wherein the conduit includes a fixed-length.

6. A tractor and a trailer combination comprising:
    a tractor including
        a tractor frame,
        a supply unit coupled to the tractor frame,
        a trailer coupling coupled to the tractor frame,
        a skid plate coupled to the tractor frame adjacent the trailer coupling, and
        a first connector coupled to the tractor frame, the first connector coupled to the supply unit to receive at least one of high voltage electrical power and coolant from the supply unit;
    a trailer including
        a trailer frame,
        a tractor coupling connected to the trailer frame and removably coupled to the trailer coupling to rotatably connect the trailer to the tractor, and
        a second connector coupled to the trailer, the second connector configured to provide the at least one of high voltage electrical power and coolant to the trailer; and
    a conduit including a first end coupled to the first connector and a second end coupled to the second connector, the conduit configured to deliver the at least one of high voltage electrical power and coolant from the first connector to the second connector, wherein the conduit flexes and is supported between the first and second ends by the skid plate throughout rotation of the trailer relative to the tractor, and wherein the conduit is a first conduit configured to deliver high voltage electrical power, the combination further comprising a third connector coupled to the tractor frame, the third connector coupled to the supply unit to receive coolant from the supply unit; a fourth connector coupled to the trailer, the fourth connector configured to provide coolant to the trailer; and a second conduit including a first end coupled to the third connector and a second end coupled to the fourth connector, the second conduit configured to deliver coolant from the third connector to the fourth connector.

7. The tractor and the trailer combination of claim 6, wherein the first conduit is a high voltage electrical cable and the second conduit is a hose.

8. A tractor and a trailer combination comprising:
a tractor including
   a tractor frame,
   a supply unit coupled to the tractor frame,
   a trailer coupling coupled to the tractor frame, and
   a first connector coupled to the tractor frame, the first connector coupled to the supply unit to receive a supply from the supply unit;
a trailer including
   a trailer frame,
   a tractor coupling connected to the trailer frame and removably coupled to the trailer coupling to rotatably connect the trailer to the tractor, and
   a second connector coupled to the trailer, the second connector configured to provide the supply to the trailer;
a conduit including a first end coupled to the first connector and a second end coupled to the second connector, the conduit configured to deliver the supply from the first connector to the second connector; and
an energy chain surrounding the conduit, the energy chain protecting and guiding the conduit between the first and second ends as the conduit flexes throughout rotation of the trailer relative to the tractor.

9. The tractor and the trailer combination of claim 8, wherein the first connector is attached to the tractor forward of the trailer coupling.

10. The tractor and the trailer combination of claim 8, wherein the first connector is attached to the tractor rearward of the trailer coupling.

11. The tractor and the trailer combination of claim 8, further comprising a low voltage electrical cable connected between the tractor and the trailer for supplying low voltage electricity to lights on the trailer, and further comprising air hoses connected between the tractor and the trailer for supplying pressurized air for brakes on the trailer.

12. The tractor and the trailer combination of claim 8, wherein the conduit includes a fixed-length.

13. The tractor and the trailer combination of claim 8, wherein the energy chain protects the conduit from abrasion.

14. The tractor and the trailer combination of claim 8, wherein the conduit is a first conduit configured to deliver high voltage electrical power, the combination further comprising a third connector coupled to the tractor frame, the third connector coupled to the supply unit to receive coolant from the supply unit; a fourth connector coupled to the trailer frame, the fourth connector configured to provide coolant to the trailer; and a second conduit including a first end coupled to the third connector and a second end coupled to the fourth connector, the second conduit configured to deliver coolant from the third connector to the fourth connector.

15. The connection for a tractor and a trailer of claim 14, wherein the first conduit is a high voltage electrical cable and the second conduit is a hose.

16. A tractor and a trailer combination comprising:
a tractor including
   a tractor frame,
   a high voltage alternator coupled to the tractor frame,
   a trailer coupling coupled to the tractor frame, and
   a first connector coupled to the tractor frame, the first connector coupled to the high voltage alternator to receive high voltage electrical power from the high voltage alternator;
a trailer including
   a trailer frame,
   an electric trailer refrigeration unit coupled to the tractor frame,
   a tractor coupling connected to the trailer frame and removably coupled to the trailer coupling to rotatably connect the trailer to the tractor, and
   a second connector coupled to the trailer, the second connector configured to provide the high voltage electrical power to the electric trailer refrigeration unit; and
a conduit including a first end coupled to the first connector and a second end coupled to the second connector, the conduit configured to deliver the high voltage electrical power from the first connector to the second connector, wherein the conduit flexes throughout rotation of the trailer relative to the tractor, and further wherein the electric trailer refrigeration unit includes a static converter coupled to the second connector to receive high voltage electrical power from the second connector and deliver to the electrical trailer refrigeration unit controlled output power suitable to drive a refrigeration system of the electric trailer refrigeration unit.

17. The tractor and the trailer combination of claim 16, further comprising a third connector coupled to the tractor frame, the third connector coupled to a cooling system of the tractor to receive coolant from the cooling system; a fourth connector coupled to the trailer frame, the fourth connector configured to provide coolant to the static converter; and a second conduit including a first end coupled to the third connector and a second end coupled to the fourth connector, the second conduit configured to deliver coolant from the third connector to the fourth connector.

18. The tractor and the trailer combination of claim 16, further comprising an energy chain surrounding the conduit, the energy chain protecting and guiding the conduit between the first and second ends as the conduit flexes throughout rotation of the trailer relative to the tractor.

19. The tractor and the trailer combination of claim 16, wherein a skid plate is coupled to the tractor adjacent the trailer coupling, and wherein the conduit flexes and is supported between the first and second ends by the skid plate throughout rotation of the trailer relative to the tractor.

* * * * *